(12) United States Patent
Pardonnet

(10) Patent No.: US 6,685,224 B2
(45) Date of Patent: Feb. 3, 2004

(54) TILT STEERING COLUMN

(75) Inventor: Dennis Pardonnet, Grand Blanc, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/033,727

(22) Filed: Dec. 27, 2001

(65) Prior Publication Data

US 2003/0122359 A1 Jul. 3, 2003

(51) Int. Cl.$^7$ ................................................. B62D 1/18
(52) U.S. Cl. ............................ 280/775; 280/777; 74/493
(58) Field of Search ............................... 280/775, 777; 74/493, 495

(56) References Cited

U.S. PATENT DOCUMENTS

| | | | | |
|---|---|---|---|---|
| 2,988,931 A | * | 6/1961 | Markley, Jr. et al. | 74/556 |
| 3,429,196 A | * | 2/1969 | White | 74/493 |
| 3,737,003 A | * | 6/1973 | Beals et al. | 180/78 |
| 4,209,074 A | * | 6/1980 | York | 180/78 |
| 5,426,994 A | * | 6/1995 | Khalifa et al. | 74/493 |
| 5,501,184 A | | 3/1996 | Engelen et al. | 123/41.29 |
| 5,503,431 A | * | 4/1996 | Yamamoto | 280/777 |
| 5,839,398 A | | 11/1998 | Hamilton | 123/41.33 |
| 5,876,065 A | * | 3/1999 | Ogura et al. | 280/777 |

* cited by examiner

Primary Examiner—Paul N. Dickson
Assistant Examiner—Laura B. Rosenberg
(74) Attorney, Agent, or Firm—Donald J. Wallace

(57) ABSTRACT

An apparatus for allowing translation of a steering wheel of a vehicle steering system along a predetermined path and retaining the steering wheel in a fixed orientation during translation along the predetermined path. The apparatus is comprised of a column mount adapted to be coupled to a steering column, a tilt head adapted to be coupled to the steering wheel in a desired orientation and at least one orientation link coupled to the column mount and tilt head. The apparatus is operable to allow relative translation of the tilt head with respect to said column mount while retaining the steering wheel in a desired orientation.

10 Claims, 5 Drawing Sheets

TILT STEERING COLUMN

FIELD OF THE INVENTION

The present invention relates to a tilt steering column for a vehicle. More particularly, the present invention relates to a steering column for a vehicle that allows variable steering wheel positioning while maintaining the steering wheel orientation.

BACKGROUND OF THE INVENTION

Steering columns employing a tilt mechanism allow simple, quick and convenient adjustment of a steering wheel in a plurality of positions. In a typical tilt mechanism, a column-mounted lever unlocks the tilt mechanism, allowing the driver to move the upper column and steering wheel to the desired position along an arcuate path in a plane defined in the longitudinal direction of the vehicle. The tilt mechanism allows the steering wheel to be placed at any one of a plurality of positions located along the arcuate path. Once the steering wheel is at the desired position, the lever is returned to the original position to lock the position of the column and the steering wheel. The orientation of the steering wheel is increasingly angled as the steering column is moved upward or downward along the arcuate path from a horizontal position.

Due to various factors, a driver may be injured through impact with the steering wheel during a collision. One of the factors is the relative proximity and orientation of the steering wheel to the driver. For example, as the steering column is tilted upwardly, a lower edge of the steering wheel is closest to the driver and may contact the chest of the driver during a collision. The reduced contact area of the steering wheel may focus collision forces when impacting the driver.

SUMMARY OF THE INVENTION

By orienting the steering wheel substantially parallel to a plane defining the driver's chest, collision forces transmitted through the steering column are distributed over a larger area, i.e., the face of the steering wheel. The present invention provides a steering column allowing translation of a steering column to reposition the steering wheel relative to the driver and control the orientation of the steering wheel relative to the driver.

In one form the present invention provides an apparatus for allowing movement of a steering column of a vehicle steering system along a predetermined path and retaining the steering wheel in a fixed orientation during translation along the predetermined path. The apparatus includes a column mount adapted to be coupled to a steering column, a tilt head adapted to be coupled to the steering wheel in a first orientation and an orientation link coupled to the column mount and tilt head and operable to allow relative translation of the tilt head with respect to the column mount while retaining the steering wheel in the first orientation.

In another form, the present invention provides a steering column tilt mechanism for a vehicle steering system allowing adjustable positioning of a steering wheel and aligning the steering wheel in an orientation generally coplanar with the chest of the vehicle driver. The steering column tilt mechanism includes a column mount coupled to the vehicle and adapted to receive a portion of the steering system; a tilt head coupled to the steering wheel to orient the steering wheel in a first orientation and adapted to receive a portion of the steering system; a plurality of orientation links movably coupled to the column mount and articulating members, and operable to allow relative translation of the tilt head with respect to the base member while retaining the steering wheel in the first orientation; and a ratcheting mechanism adapted to secure the tilt head in a plurality of different locations selectable by the vehicle driver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
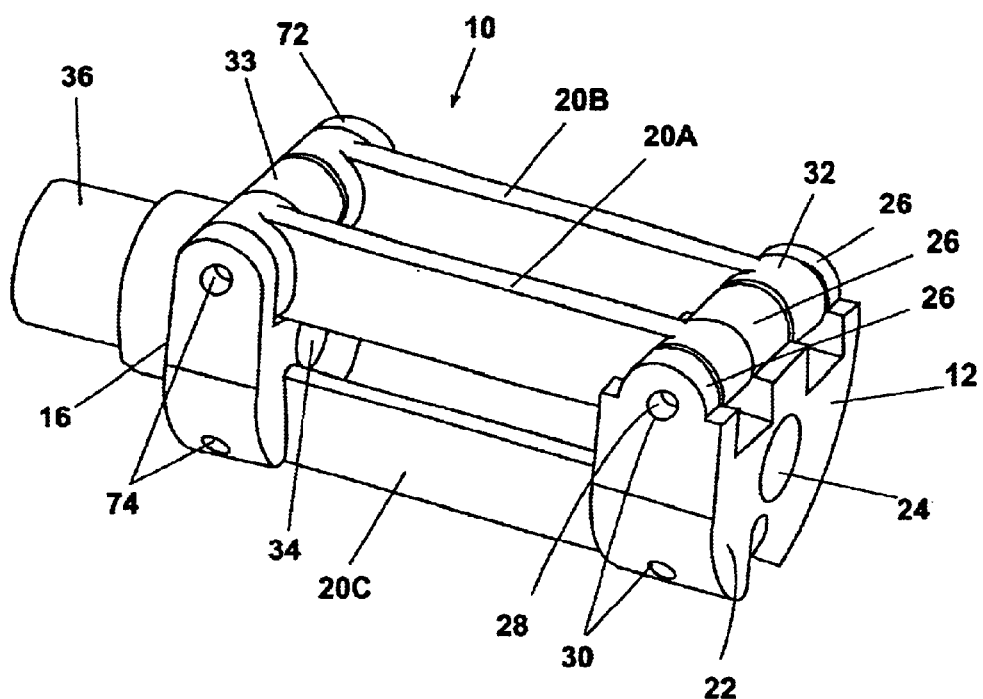
FIG. 1 is a perspective view of a first embodiment of a tilt steering column constructed in accordance with the teachings of the present invention.
Figure 2:
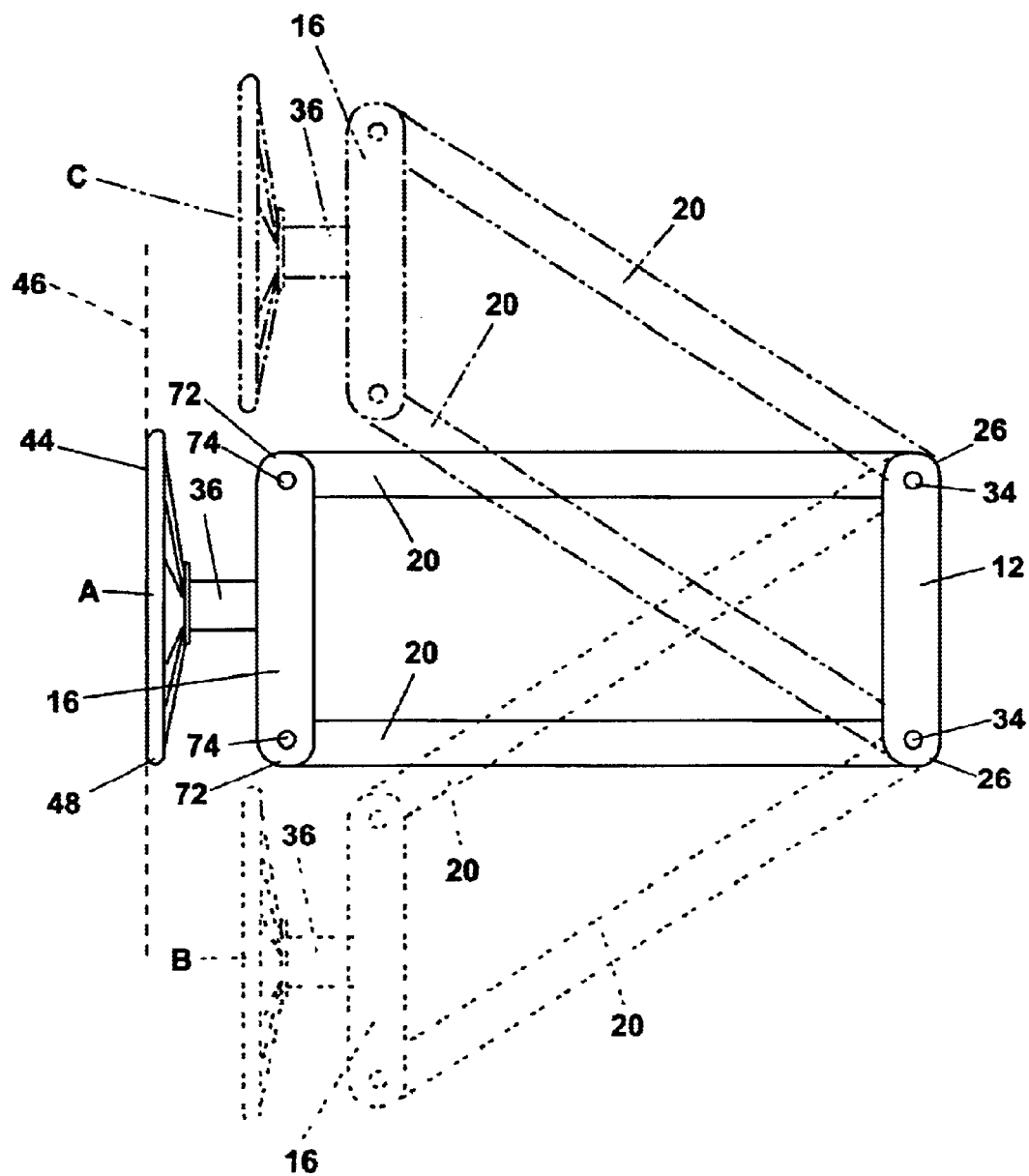
FIG. 2 is a side view of the tilt steering column of FIG. 1 in a plurality of different positions shown in phantom.
Figure 3:
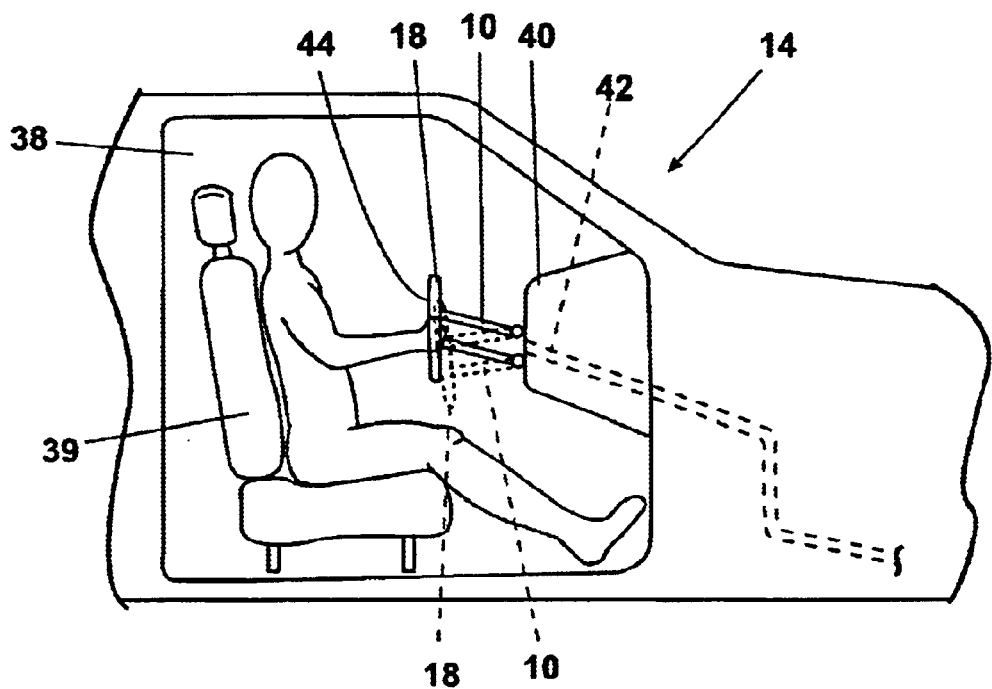
FIG. 3 is a partial side view of a motor vehicle employing the tilt steering column of FIG. 1.

With reference to FIGS. 1–3, a tilt steering column 10 is shown in accordance with a first embodiment of the present invention. The tilt steering column 10 is shown to include a column mount 12 adapted to be attached to a vehicle 14, a tilt head 16 adapted to be attached to a steering wheel 18 and a plurality of orientation links 20 that are rotatably coupled to both the column mount 12 and the tilt head 16. In operation, the tilt steering column 10 allows the steering wheel 18 to be positioned in various positions corresponding to the position of the driver. The tilt steering column 10 also aligns the steering wheel 18 in an orientation that more uniformly distributes any collision force applied to the driver when contacting the steering wheel 18 during a collision.

As shown in FIG. 1, the column mount 12 generally includes a main body portion 22 substantially defining the shape of the column mount 12. The column mount 12 also includes an aperture 24 for receiving a portion of the tilt steering mechanism (not shown). The aperture 24 is shown as a bore extending through the column mount 12 in an axial direction. It is contemplated that the aperture 24 may be formed in a variety of different shapes such as a slot or a channel extending through the column mount 12 to receive a portion of the steering mechanism. Additionally, the column mount 12 includes a plurality of attachment ribs 26 for attaching the orientation links 20 to the column mount 12. As shown, attachment ribs 26 extend from the main body portion 22 of the column mount 12 and include a bore 28 formed therethrough for rotatably coupling the orientation links 20 to the column mount 12.

A total of three orientation links 20 are shown included in the tilt steering column 10. Two orientation links 20A and 20B are formed on the top portion of the tilt steering column 10. One orientation link 20C is formed on the lower portion of the tilt steering column 10. More, less or a different configuration of orientation links 20 may be utilized with the present invention.

The bores 28 that extend through the attachment ribs 26 are formed generally perpendicular to a plane defined by the desired movement of the tilt steering column 10. The orientation of the bores 28 allows the tilt head 16 and thus the steering wheel 18 to be translated in an upward or downward direction. As shown in FIG. 1, the bores 28 are formed to receive a pin 30 to rotatably couple the orientation links 20 to the column mount 12.

The orientation links 20 are formed to be elongated members having a bore 32 formed at each end for attaching the orientation link 20 to the column mount 12 and the tilt head 16. The length of the column mount 12 determines the distance that the tilt head 16 and the steering wheel 18 are from the vehicle driver. The orientation links 20 are preferably formed of a rigid, high strength material such as steel. Other suitable materials include aluminum, nylon or metallic alloys, or other materials known in the art. It is also contemplated that the orientation links 20 be formed of a deformable material such as an elastomer to reduce the forces that are transferred from the steering wheel 18 to the vehicle driver. A deformable material allows the orientation links 20 to absorb a portion of the energy from the collision, thus lowering the total amount of energy that is transferred to the driver of the vehicle 14. Possible deformable materials include polyethylene, elastomers, or stamped metals, among other materials known in the art.

The tilt head 16 includes a base portion 33 having an aperture 34 formed therethrough in the axial direction to receive a portion of the steering mechanism. The aperture 34 is shown as a bore extending through the tilt head 16 in an axial direction. The aperture 34 may be formed in a variety of different shapes, such as a slot or a channel extending through the tilt head 16 and still receive a portion of the steering mechanism. The tilt head 16 also includes a collar 36 extending from the base portion 33 for coupling the tilt head 16 to the steering wheel 18. The collar 36 extends outward from the base portion 33 at an angle that is desirable to position the plane of the steering wheel 18 generally parallel to the plane of a vehicle driver's chest. The collar 36 is shown to extend axially from the base portion 34 to orient the steering wheel 18 generally perpendicular to the collar 36. Additionally, the tilt head 16 includes a plurality of attachment ribs 72 for attaching the orientation links 20 to the tilt head 16. As shown, attachment ribs 72 extend from the base portion 33 of the tilt head 16 and include a bore 74 formed therethrough for rotatably coupling the orientation links 20 to the tilt head 16.

In operation, the tilt steering column 10 guides the steering wheel 18 along a predetermined path. The predetermined path includes various positions corresponding to the driver's desired positioning of the steering wheel 18. As shown in FIG. 2, the tilt steering column 10 of the present invention is positionable in various positions. The tilt steering column 10 is shown in three different configurations for purposes of clarity. The tilt steering column 10 is positionable in a plurality of different positions not shown in the present illustration.

Shown in continuous lines, the steering wheel 18 may be located in an intermediate position wherein the steering wheel 18 is located at a first position A. Also in the intermediate position, a front surface 44 of the steering wheel 18 defines a plane 46 generally parallel in orientation to the driver's chest.

The desired location of the steering wheel 18 varies depending on the driver of the vehicle 14. Therefore, the tilt steering column 10 is also operable in a lowered position, shown in hidden lines. In the lowered position, the steering wheel 18 is located at a second position B that is relatively lower than position A. When the steering wheel 18 is at position B, the operation of the steering wheel 18 is made easier for drivers desiring a lower steering wheel position. Also, when the steering wheel 18 is positioned in the lowered position, the front surface 44 of the steering wheel 18 remains generally parallel to the plane 46 and to the driver's chest. The orientation of the steering wheel 18 is controlled by the orientation links 20, which are substantially similar in length and cause the tilt head 16 to translate along a predetermined path while maintaining the same orientation of the tilt head 16 and, thus, the steering wheel 18 to the vehicle driver. The orientation links 20 could be formed to different lengths if necessary to orient the tilt head 16 and the steering wheel 18 to the vehicle driver.

The tilt steering column 10 may also be positioned in an elevated position, shown in phantom lines. The elevated position may allow for easier ingress and egress of the driver to the vehicle 14. In the elevated position, the steering wheel 18 is located at position C that is relatively higher than position A. Also in the elevated configuration, the orientation of the steering wheel 18, in a plane parallel to the vehicle driver's chest is maintained.

FIG. 3 shows the tilt steering column 10 within an automotive vehicle 14, which includes a passenger compartment 38 having a seat 39 and a dash panel 40. The dash panel 40 is positioned along a front portion of the passenger compartment 38 and includes controls for the automotive vehicle 14, including steering. In a typical tilt steering column for an automotive vehicle 14, a complex steering system is operable by a shaft 42 that extends through a portion of the dash panel 40.

The column mount 12 of the tilt steering column 10 is coupled to a portion of the vehicle 14 by common fasteners. The column mount 12 is positioned to receive the shaft 42 of the tilt steering column 10 through the aperture 24. The tilt head 16 and orientation links 20 of the tilt steering column 10 are positioned to allow the tilt head 16 to translate in an upward or downward direction. The remainder of the steering mechanism is housed within the tilt steering column 10 and connected to the steering wheel 18.

As shown in FIG. 3, the driver of the vehicle 14 is able to adjust the location of the steering wheel 18 while retaining the desired orientation of the steering wheel 18.

If the driver of the vehicle 14 is accelerated toward the front of the vehicle 14, the driver of the vehicle may impact the steering wheel 18 of the vehicle 14. Given the relative positioning of the driver's body, the chest 46 portion of the driver typically impacts the steering wheel 18. In certain conventional assemblies the steering wheel 18 is rotated from a generally planar orientation relative the driver at lower positions to a generally obtuse angle at elevated positions. Upon impact with the steering wheel 18, the driver's body is rapidly decelerated by contact with the steering wheel 18. If the angle or orientation of the steering wheel 18 is altered as the position of the steering wheel 18 is elevated, less than the entire steering wheel contacts the driver's body during a collision. By focusing the collision force transmitted through the steering wheel 18, increased localized trauma may occur.

In the event of a collision, the front surface 44 of the steering wheel 18 is oriented generally parallel to the driver's chest. In this configuration, an increased area of the front surface 44 of the steering wheel 18 will contact the chest of the driver, allowing any collision forces to be dissipated over a larger portion of the driver's body. The larger contact area may reduce any injuries that are sustained from impact with the steering wheel 18.

By contrast, where the steering wheel 18 has an angled orientation, the driver's body is rapidly decelerated by impact with a smaller portion of the steering wheel 18, typically the lower rim portion 48, causing a small portion of the driver's body to absorb and dissipate any collision forces.

Figure 4:
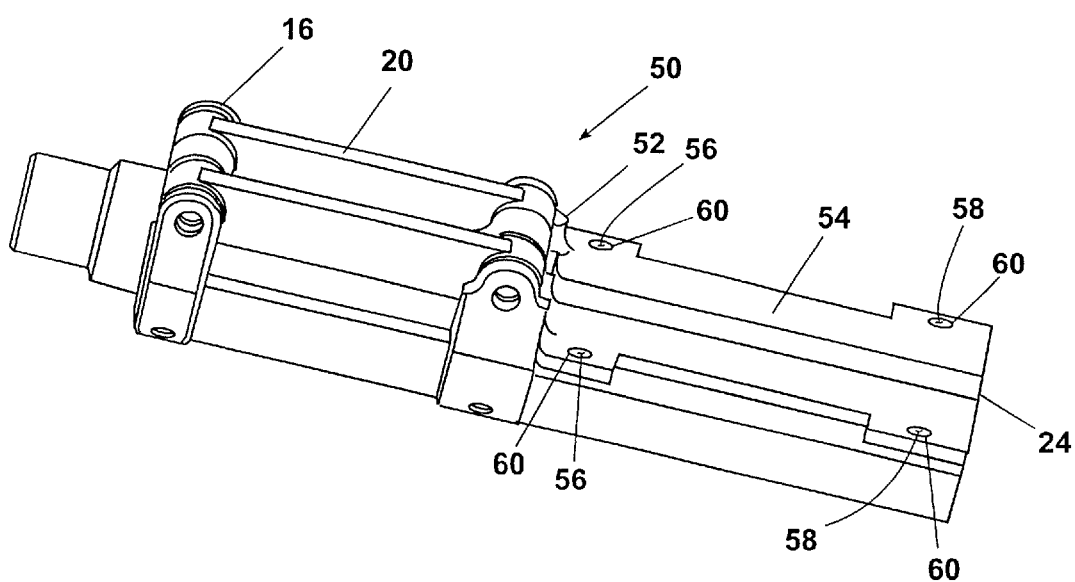
FIG. 4 is a perspective view of a second embodiment of a tilt steering column constructed in accordance with the teachings of the present invention.

FIG. 4 shows a second embodiment of a tilt steering column 50 constructed in accordance with the present invention. The tilt steering column 50 is substantially similar to the tilt steering column 10 described above with a few features that will be described in detail. The tilt steering column 50 includes a column support 52 having a mounting platform 54 extending therefrom. The mounting platform 54 includes a first and second set of mounting flanges 56, 58 each having mounting holes 60 formed therein. The mounting flanges 56, 58 and holes 60 relate to mounting holes in the frame of the vehicle 14 for operatively mounting the tilt column support 52 with common fasteners. The tilt steering column 50 of the present invention may include deformable fasteners 74 such as shear capsules to releasably couple the mounting platform to the vehicle 14.

Figure 5:
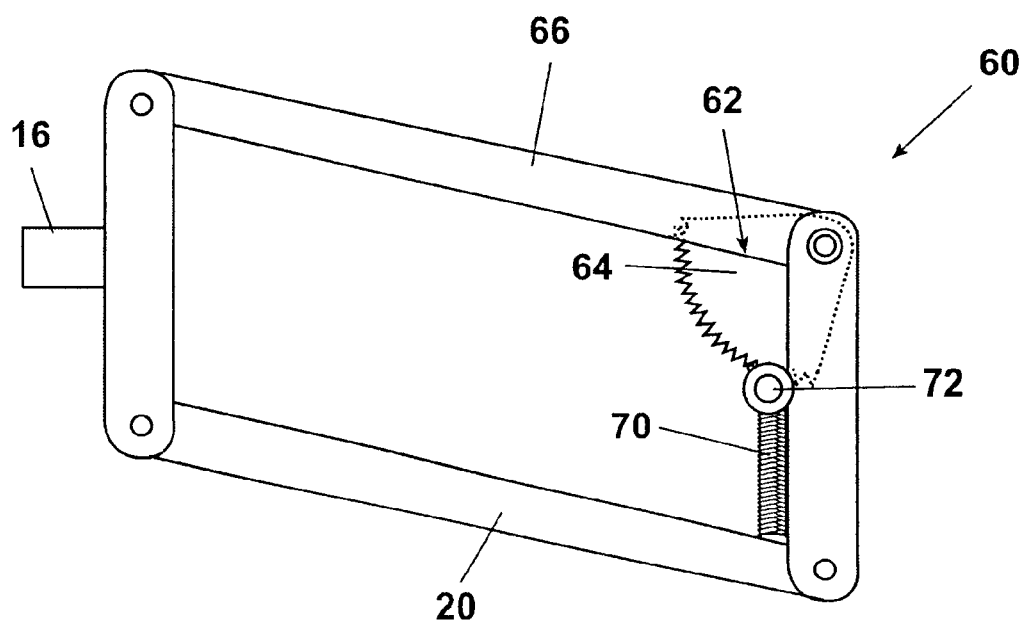
FIG. 5 is a perspective view of a third embodiment of a tilt steering column constructed in accordance with the teachings of the present invention.

A third embodiment of a tilt steering column 60 according to the teachings of the present invention is shown in FIG. 5. The tilt steering column 60 is substantially similar to the tilt steering column 10 described above except for the differences that are detailed below. The tilt steering column 60 includes a tilt mechanism 62 to operatively couple the tilt steering column 60 in any of a plurality of positions. The tilt mechanism 62 is comprised of a detent mechanism 64 coupled to the column mount 12 and the upper orientation link 66. The detent mechanism 64 prevents movement of the upper orientation link 66, which in turn prevents movement of the tilt head 16. The tilt mechanism 62 also includes an activation device, such as a tilt lever 72, to allow the driver of the vehicle 14 to select the position of the tilt steering column 10. The tilt steering column 60 may include a biasing member 70 operable to urge the tilt steering column 60 in a direction during adjustment of the tilt steering column 60.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for allowing translation of a steering wheel of a vehicle steering system along a predetermined path and retaining the steering wheel in a fixed orientation during translation along the predetermined path comprising:

a column mount adapted to be coupled to the vehicle and comprising a first axially extending aperture;

a tilt head adapted to be coupled to the steering wheel in said fixed orientation and comprising a second axially extending aperture defining an axis perpendicular to a plane defined by the steering wheel; and an orientation link coupled to said column mount and tilt head and operable to allow relative translation of said tilt head with respect to said column mount while retaining the steering wheel in said fixed orientation, the first and second axially extending apertures and the orientation link defining a continuous passage for receiving a portion of the vehicle steering system therethrough.

2. The apparatus of claim 1 wherein said orientation of the steering wheel effectively reduces injury resulting from contact between the vehicle driver and the steering wheel in the event of a collision by increasing the area of contact between the steering wheel and the vehicle driver.

3. The apparatus of claim 2 wherein said orientation link is rotatably coupled to said column mount and tilt head to allow relative translation of the steering wheel in an upward or a downward direction to allow positioning relative to the vehicle driver.

4. The apparatus of claim 1 wherein said orientation link is rotatably coupled to said column mount and said tilt head.

5. The apparatus of claim 4 wherein said orientation link is deformable upon contact of the vehicle driver with the steering wheel during a collision.

6. The apparatus of claim 4 further comprising a ratcheting mechanism operable to secure said orientation link in a plurality of fixed positions.

7. The steering column tilt mechanism of claim 6 wherein said ratcheting mechanism includes a biasing member to urge said tilt head toward a first position.

8. The apparatus of claim 1 wherein said column mount is coupled to the vehicle by a deformable member operable to deform during a collision.

9. The apparatus of claim 1, wherein said orientation link comprises a first orientation link, the apparatus further comprising at least a second orientation link, wherein the first and second orientation links are substantially similar in length.

10. The apparatus of claim 1, wherein said orientation link comprises a first orientation link, the apparatus further comprising at least a second orientation link, wherein said first and second orientation links are different in length for determining said fixed orientation.

* * * * *